United States Patent [19]

Itoyama

[11] Patent Number: 5,115,779

[45] Date of Patent: May 26, 1992

[54] ENGINE KNOCK DETECTING SYSTEM

[75] Inventor: Hiroyuki Itoyama, Kanagawa, Japan

[73] Assignee: Nissan Motor Company, Ltd., Yokohama, Japan

[21] Appl. No.: 708,274

[22] Filed: May 31, 1991

[30] Foreign Application Priority Data

Jun. 11, 1990 [JP] Japan .................. 2-149783

[51] Int. Cl.⁵ .................. F02P 5/145; F02D 41/04
[52] U.S. Cl. .................. 123/425; 123/435; 73/35
[58] Field of Search .......... 123/425, 435; 73/35, 73/35 KR, 35 K, 35 I, 35 M, 35 P

[56] References Cited

U.S. PATENT DOCUMENTS

| 4,364,260 | 12/1982 | Chen et al. ............ 73/35 K |
| 4,492,109 | 1/1985 | Ozaki et al. ............ 73/35 KS |
| 4,899,710 | 2/1990 | Takahashi ............ 123/425 |
| 4,943,776 | 7/1990 | Polito et al. ............ 73/35 K |

FOREIGN PATENT DOCUMENTS

| 58-28646 | 2/1983 | Japan . |
| 58-71431 | 4/1983 | Japan . |
| 64-54227 | 3/1989 | Japan . |
| 0092624 | 4/1989 | Japan ............ 73/35 |
| 1-178773 | 7/1989 | Japan . |

Primary Examiner—Willis R. Wolfe
Attorney, Agent, or Firm—Lowe, Price, LeBlanc & Becker

[57] ABSTRACT

An engine knocking detecting system is disclosed, which comprises an engine vibration sensing device which produces a signal which represents a vibration of an engine; an engine speed sensing device which produces a signal which represents the speed of the engine; parallelly arranged band-pass filters to which the vibration representative signal from the engine vibration sensing device is fed simultaneously, the band-pass filters having respective pass-bands which are not overlapped; and a knocking judging device for judging whether the engine is under knocking or not by analyzing the output signals issued from the band-pass filters and the engine speed representative signal from the engine speed sensing device.

7 Claims, 8 Drawing Sheets

ENGINE KNOCK DETECTING SYSTEM

BACKGROUND OF THE INVENTION

1. Field of the Invention

The present invention relates in general to systems for detecting undesirable conditions of an internal combustion engine, and more particularly to systems for detecting knocking of the engine.

2. Description of the Prior Art

As is known, engine knocking caused by rapid preflame reactions within the end gases lowers the output and the thermal efficiency of the engine.

In order to reduce the knocking, various measures are commonly employed, which are, for example, usage of a fuel having a higher octane rating, lowering of combustion pressure and/or combustion temperature, reducing of the time during which the end gases are under high pressures and temperatures. However, these measures have failed to exhibit satisfied results.

Thus, recently, there have been proposed systems in which a knocking sensor is employed for detecting the undesired engine knocking, and in which when an engine knocking is detected by the knocking sensor, a spark advancer is actuated to delay the ignition timing thereby suppressing or at least minimizing the engine knocking.

One of such systems is shown in Japanese Patent First Provisional Publication No. 64-54227. In the system of this publication, an engine vibration representative signal issued from a knocking sensor is passed through a band-pass filter means. The filtered signal from this filter means is compared with a reference signal to determine whether the engine is under knocking or not. The band-pass filter means is so controlled as to narrow the pass-band thereof for minimizing noise possessed by the filtered signal. In fact, if the pass-band of the filter is not narrowed enough, the S/N ratio of the filtered signal increases and thus the detection of a small knocking of the engine becomes difficult.

In the disclosed system, the filter means consists of a knocking controlling band-pass filter whose pass-band is variable and two additional band-pass filters which control the pass-band of the knocking controlling band-pass filter. The pass-band change is carried out based on the peaked outputs of the three band-pass filters which are obtained after the knocking detection by the knocking controlling band-pass filter, and thus, the frequency pass-bands of these three filters are overlapped.

That is, for the pass-band change, with reference to the peaked levels of the engine vibration representative signals from the filters, the center frequencies of the three band-pass filters are weighted to obtain a mean frequency which is treated as a practical knocking frequency. In fact, the mean frequency is used as the center frequency of the knocking controlling filter.

Although, as is described hereinabove, the disclosed system can reduce the noise of the filtered signal by narrowing the frequency pass-band, the same has the following drawback due to its inherent construction.

That is, in the disclosed system, the knocking occurrence within the narrowed pass-band is absolutely necessary. However, as is known, a knocking representative frequency is not always contained within the narrowed pass-band, and thus satisfied knocking detection is not expected from such conventional system.

SUMMARY OF THE INVENTION

It is therefore an object of the present invention to provide a measure which is free of the above-mentioned drawback.

According to the present invention, there is provided an engine knocking detecting system which has a satisfied knocking detecting ability.

According to the present invention, there is provided an engine knocking detecting system which comprises an engine vibration sensing means which produces a signal which represents a vibration of an engine; an engine speed sensing means which produces a signal which represents the speed of the engine; parallelly arranged band-pass filters to which the vibration representative signal from the engine vibration sensing means is fed simultaneously, the band-pass filters having respective pass-bands which are not overlapped; and knocking judging means for judging whether the engine is under knocking or not by analyzing the output signals issued from the band-pass filters and the engine speed representative signal from said engine speed sensing means.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
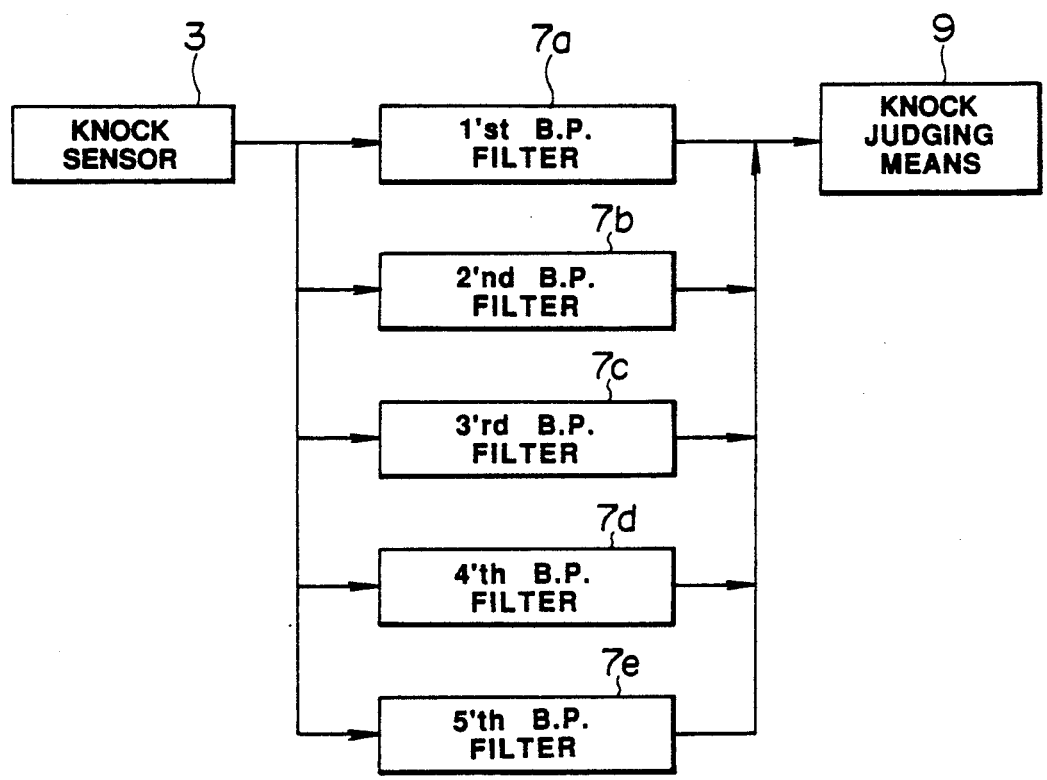
FIG. 1 is a block diagram showing the concept of the present invention.
Figure 2:
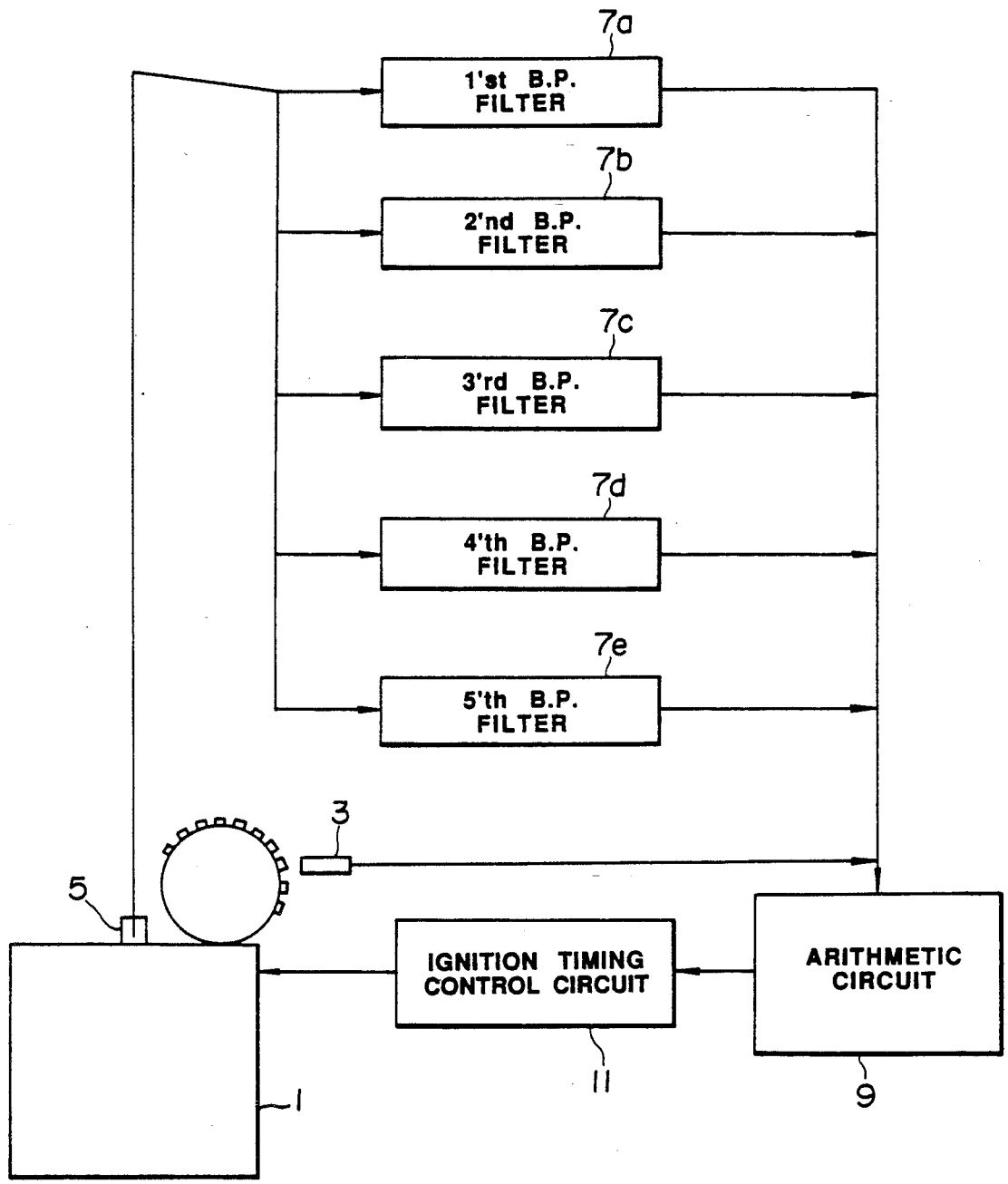
FIG. 2 is a block diagram of a first embodiment of the present invention.

Referring to FIG. 2 of the drawings, there is shown an embodiment of the present invention.

In the drawing, denoted by numeral 1 is an internal combustion engine. Denoted by numeral 3 is a crank angle sensor which detects the speed of the engine 1, and denoted by numeral 5 is a knocking sensor which senses the vibration of the engine 1. The knocking sensor 5 is, for example, of a piezoelectric type which can transduce the engine vibration to an electric signal. Denoted by numerals 7a, 7b, 7c, 7d and 7e are five parallelly arranged band-pass filters which serve as a band-pass means. The engine vibration representative signal from the knocking sensor 5 is fed to the fie band-pass filters 7a, 7b, 7c, 7d and 7e. Signals filtered by these filters are fed to an arithmetic circuit 9. The engine speed representative signal from the crank angle sensor 3 is fed also to the arithmetic circuit 9. Denoted by numeral 11 is a control circuit which controls an ignition timing of the engine 1 in accordance with an instruction signal from the arithmetic circuit 9.

The five band-pass filters 7a, 7b, 7c, 7d and 7e have respective pass-bands which are not overlapped. The different filtered signals from these five filters are treated or used as knocking representative signals. By analyzing the knocking representative signals, the arithmetic circuit 9 judges whether the engine is under knocking or not, and in accordance with this judgement, the ignition timing control circuit 11 controls the ignition timing of the engine 1.

Figure 3:
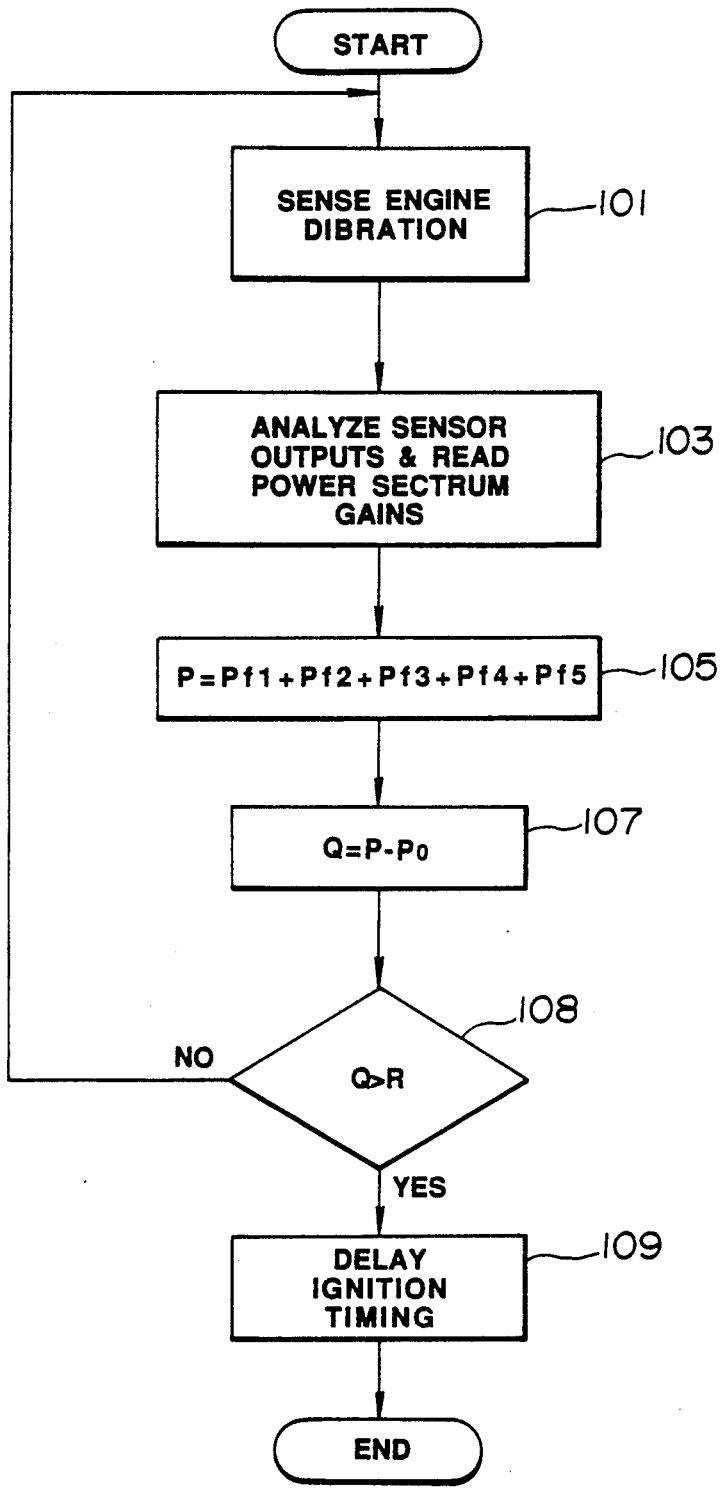
FIG. 3 is a flowchart showing operation steps carried out in a control unit employed in the first embodiment of the present invention.

The operation steps for controlling the ignition timing of the engine will be described with reference to the flowchart of FIG. 3.

By the knocking sensor 5, engine vibration is sensed (Step 101). The engine vibration representative signal from the knocking sensor 5 is fed to the five band-pass filters 7a, 7b, 7c, 7d and 7e, so that, as is seen from the graph of FIG. 4, five different frequency bands of the signal are respectively filtered by the five band-pass filters 7a, 7b, 7c, 7d and 7e to obtain knocking vibration modes f1, f2, f3, f4 and f5 of the respective bands, and respective power spectrum gains Pf1, Pf2, Pf3, Pf4 and Pf5 of these modes f1, f2, f3, f4 and f5 are read (Step 103).

Figure 4:
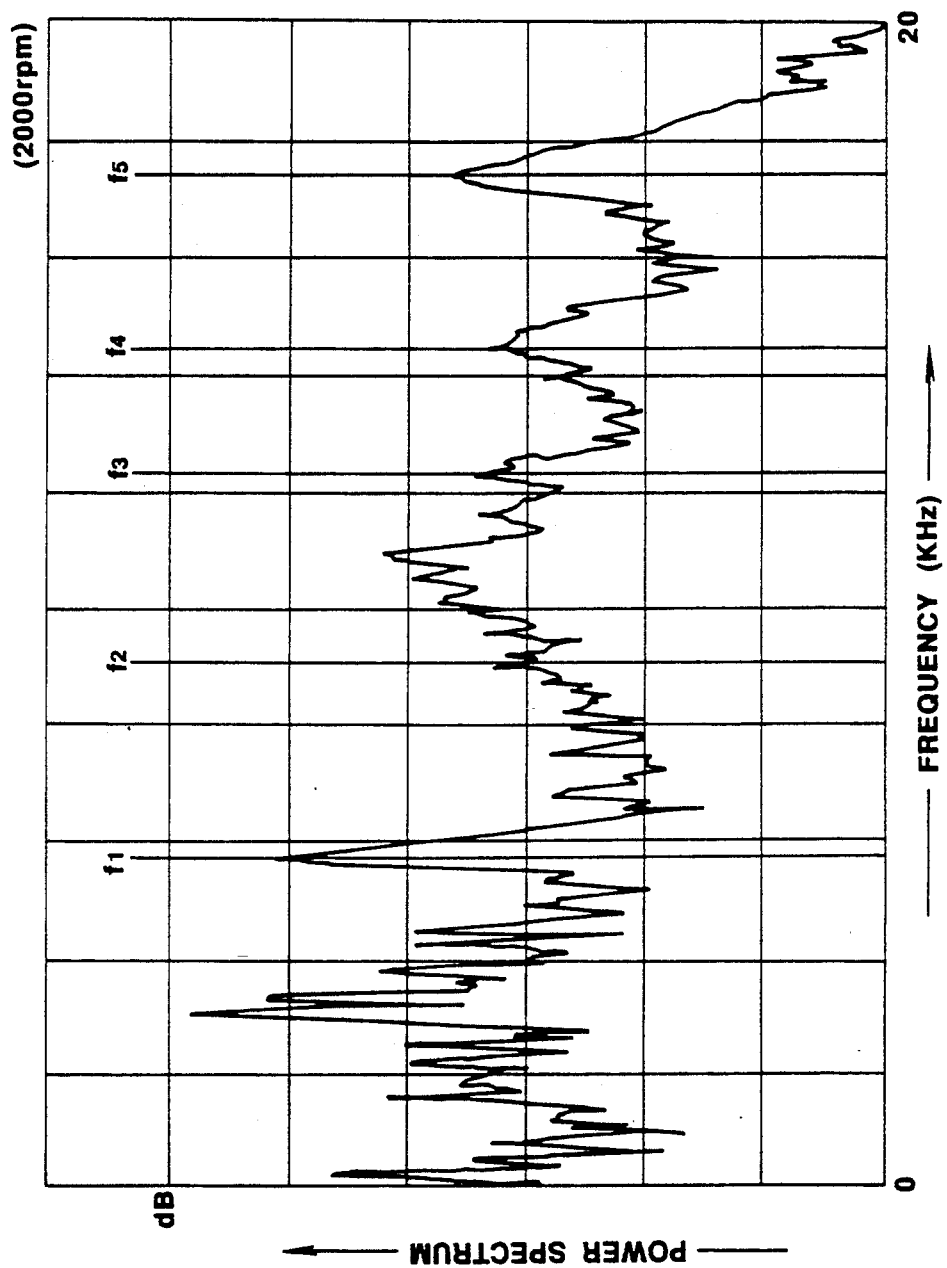
FIG. 4 is a graph showing a frequency power spectrum obtained when the engine runs at 2000 rpm.

It is to be noted that the graph of FIG. 4 shows a frequency power spectrum at the time when the engine 1 runs at 2000 rpm with knocking.

Then, the power spectrum gains Pf1, Pf2, Pf3, Pf4 and Pf5 are added to obtain the sum total P of them (Step 105). Then, a difference Q between the sum total P and a reference gain Po is obtained (Step 107), the reference gain Po being based on an output signal of the knocking sensor 5 issued when the engine runs without knocking. By analyzing the difference Q, judgement is carried out as to whether the engine is under knocking or not. That is, when the difference Q is greater than a reference value R, it is judged that the engine is under knocking. Upon this judgement, the ignition timing is delayed by the ignition timing control circuit 11 for suppressing the knocking (Step 109).

Figure 5:
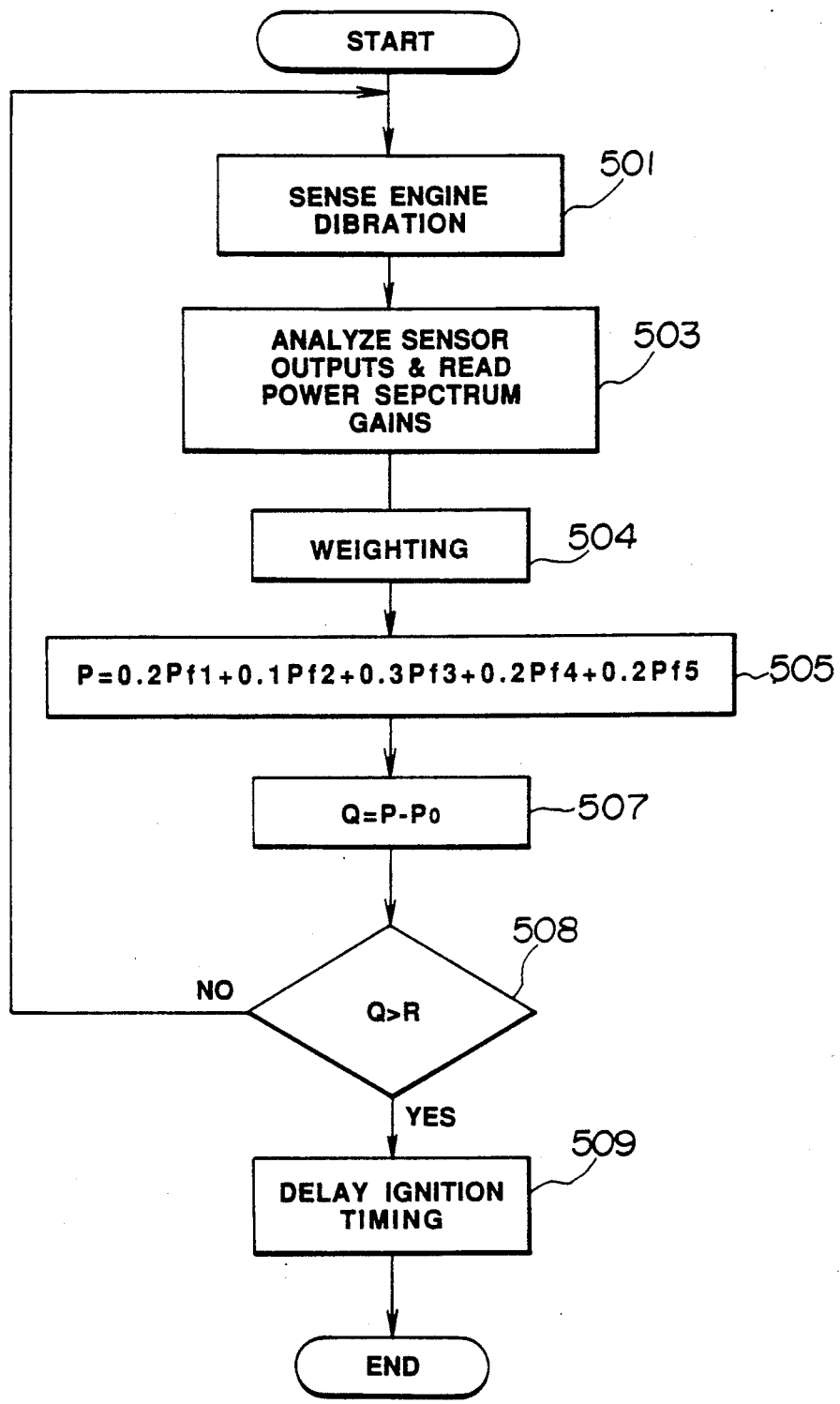
FIG. 5 is a flow chart showing operation steps carried out in a second embodiment of the invention when the engine runs at 2000 rpm.
Figure 6:
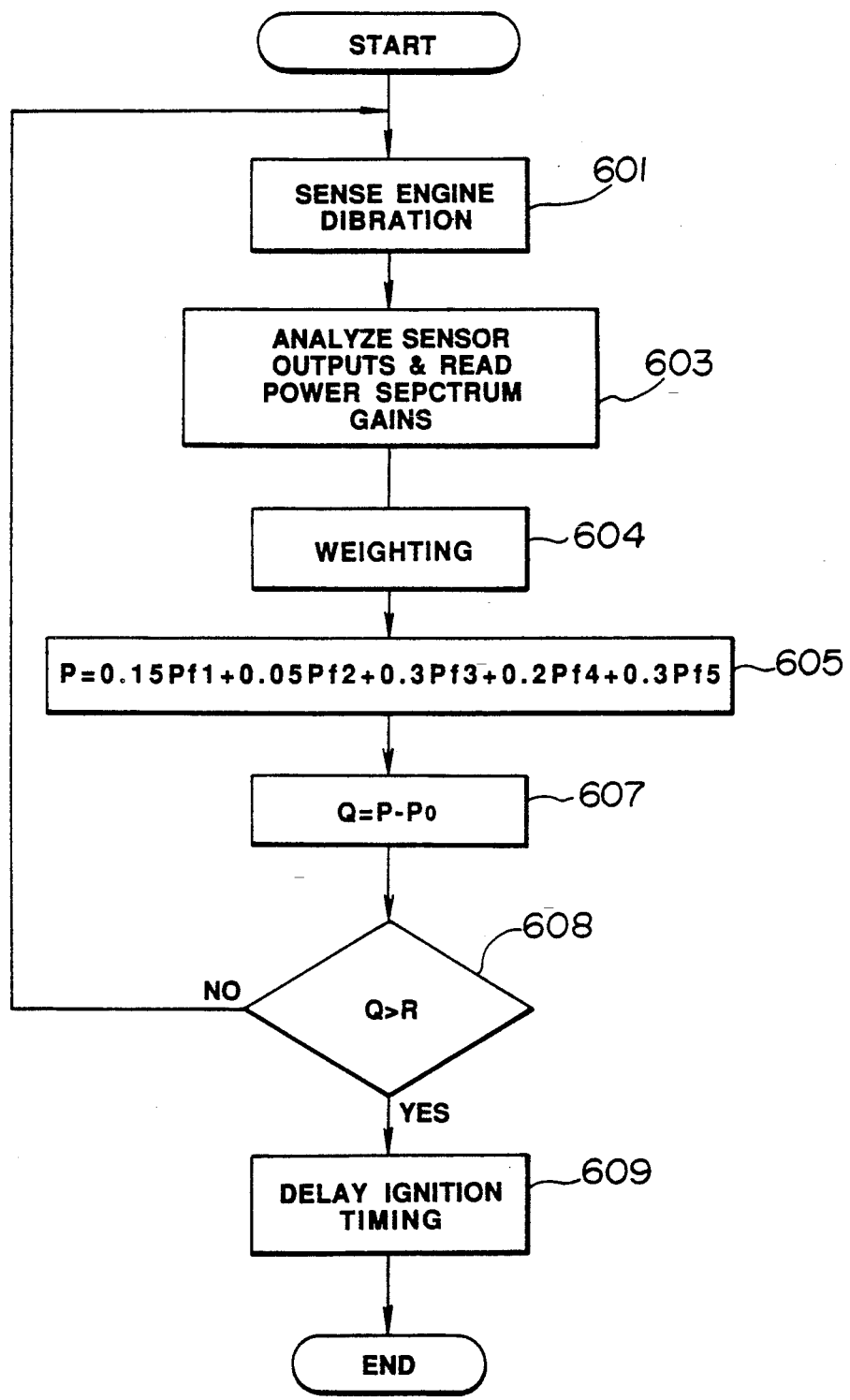
FIG. 6 is a flow chart showing operation steps carried out in the second embodiment when the engine runs at 4000 rpm.

Referring to FIGS. 5 and 6, there are shown flowcharts showing operation steps carried out in a second embodiment of the present invention.

In this embodiment, the outputs of the five band-pass filters 7a to 7e are weighted in accordance with the engine speed detected by the crank angle sensor 3 for achieving much reliable knocking detection.

Figure 7:
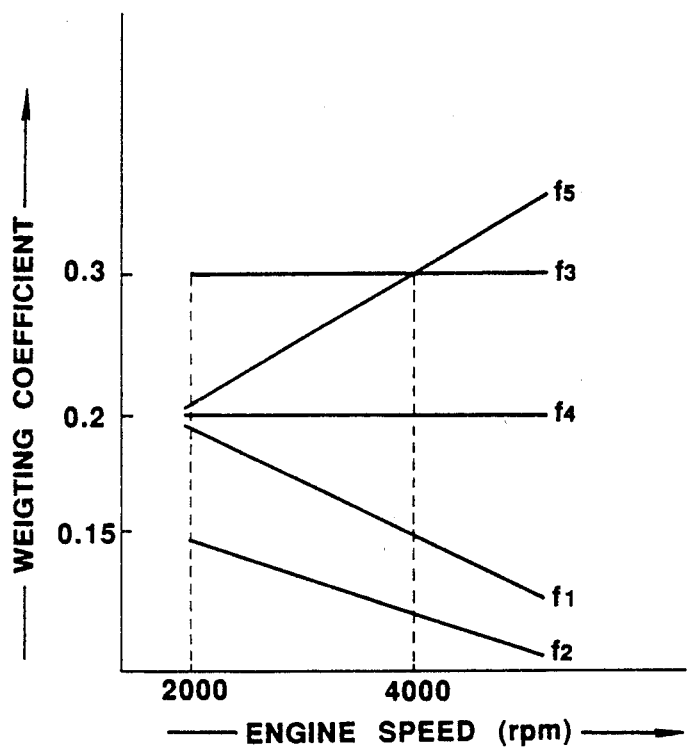
FIG. 7 is a graph showing a correlation between an engine speed and a weighting coefficient.
Figure 8:
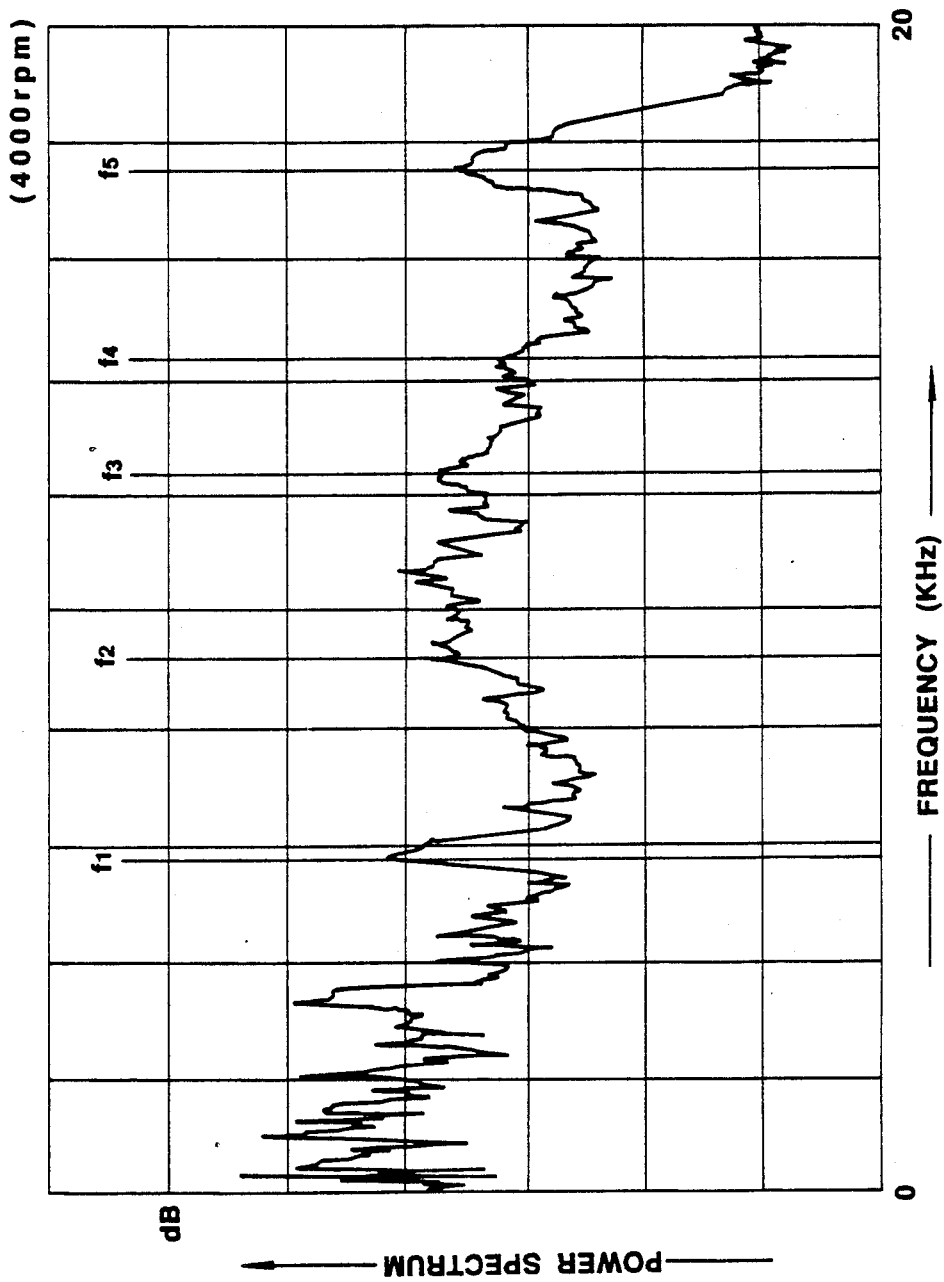
FIG. 8 is a graph showing a frequency power spectrum obtained when the engine runs at 4000 rpm.

As is seen from the graph of FIG. 7, the weighting coefficients at the vibration modes f3 and f4 are constant irrespective of engine speed, the weighting coefficients at the vibration modes f1 and f2 decrease with increase of engine speed, and the weighting coefficient at the vibration mode f5 increases with increase of engine speed.

The reason why the weighting coefficients at the vibration modes f3 and f4 are constant is as follows.

This is because the vibration modes f3 and f4 take place at substantially all engine speeds irrespective of whether the engine is under knocking or not. Furthermore, since the vibration mode f3 appears much frequently at all engine speed as compared with the vibration mode f4, the weighting coefficient of the mode f3 is larger than that of the mode f4. It is to be noted that the power spectrum levels of the modes f3 and f4 at the time when the engine is under knocking are higher than those at the time when the engine runs without knocking.

The reason why the weighting coefficients at the vibration modes f1 and f2 decrease with increase of the engine speed is as follows.

This is because the difference between the power spectrum gain Pf1 and Pf2 and the knocking reference gain Po becomes small with increase of the engine speed.

The reason why the weighting coefficient at the vibration mode f5 increases with increase of the engine speed is as follows.

This is because the difference between the power spectrum gain Pf5 and the knocking reference gain Po increases with increase of the engine speed.

The operation steps of this second embodiment will be described with reference to the flowcharts of FIGS. 5 and 6 and the correlation graph of FIG. 7. It is to be noted that the flowchart of FIG. 5 shows the operation steps carried out when the engine runs at 2000 rpm, while the flowchart of FIG. 6 shows the operation steps carried out when the engine runs at 4000 rpm. As has been mentioned hereinabove, when the engine runs at 2000 rpm, the vibration representative signal from the knocking sensor 5 shows such a frequency power spectrum as shown in FIG. 4.

As is seen from the flowchart of FIG. 5 which shows the operation steps carried out when the engine runs at 2000 rpm, at Step 540, the power spectrum gains Pf1, Pf2, Pf3, Pf4 and Pf5 of the vibration modes f1, f2, f3, f4 and f4 are weighted by the weighting coefficients 0.2, 0.1, 0.3, 0.2 and 0.2 (see FIG. 7). Then, the weighted power spectrum gains are added to obtain the sum total P (Step 505), that is:

$$P = 0.2Pf1 + 0.1Pf2 + 0.3Pf3 + 0.2Pf4 + 0.2Pf5 \quad (1)$$

Similar to the case of the above-mentioned first embodiment, the sum total P is compared with the knocking reference gain Po to judge whether the engine is under knocking or not (Steps 507 and 508). If judged that the engine is under knocking, the ignition timing is delayed by the ignition timing control circuit 11 (Step 509).

As is seen from the flowchart of FIG. 6 which shows the operation steps carried out when the engine runs at 4000 rpm, at Step 604, the power spectrum gains Pf1, Pf2, Pf3, Pf4 and Pf5 of the vibration modes f1, f2, f3, f4 and f4 are weighted by the weighting coefficients 0.15, 0.05, 0.3, 0.2 and 0.3 (see FIG. 7). Then, the weighted power spectrum gains are added to obtain the sum total P (Step 605), that is:

$$P = 0.15Pf1 + 0.05Pf2 + 0.3Pf3 + 0.2Pf4 + 0.3Pf5 \quad (2)$$

Similar to the case of the above-mentioned first embodiment, the sum total P is compared with the knocking reference gain Po to judge whether the engine is under knocking or not (Steps 607 and 608). If judged that the engine is under knocking, the ignition timing is delayed by the ignition timing control circuit 11 (Step 609).

As is described hereinabove, in the present invention, five parallelly arranged band-pass filters 7a to 7e are employed which have respective pass-bands which are not overlapped, and the outputs from these five band-pass filters 7a to 7e are all used for producing a more practical knocking representative signal. Thus, higher knocking detecting ability is obtained. Particularly, in the second embodiment, the weighting technique is used for obtaining much more practical knocking representative signal. Thus, much reliable knocking detection is obtained from the second embodiment.

If desired, the power spectrum gains Pf1, Pf2, Pf3, Pf4 and Pf5 may be weighted by not only the engine speed but also an engine temperature. In this case, a coolant temperature sensor can be used for detecting the engine temperature.

I claim:

1. An engine knocking detecting system comprising:
   an engine vibration sensing means which produces a signal which represents a vibration of an engine;
   an engine speed sensing means which produces a signal which represents the speed of the engine;
   parallel arranged band-pass filters to which the vibration representative signal from said engine vibration sensing means is fed simultaneously, said band-pass filters having respective pass-bands which are not overlapped; and
   knocking judging means for judging whether the engine is under knocking or not by analyzing the output signals issued from said band-pass filters and the engine speed representative signal from said engine speed sensing means,
   wherein said knocking judging means includes:
     means for deriving respective power spectrum gains of the output signals of said band-pass filters at each engine speed;
     means for adding said power spectrum gains to obtain a sum total; and
     means for comparing said sum total with a reference gain.

2. An engine knocking detecting system as claimed in claim 1, in which said knocking judging means further comprises weighting means which weights the respective power spectrum gains in accordance with the rotation speed of the engine.

3. An engine knocking detecting system as claimed in claim 1, in which said engine vibration sensing means is a piezoelectric type knocking sensor.

4. An engine knocking detecting system as claimed in claim 2, comprising five said band-pass filters.

5. An engine knocking detecting system as claimed in claim 4, in which the weighting coefficients of the power spectrum gains obtained from the outputs of the third and fourth band-pass filters are made constant irrespective of the engine speed, in which the weighting coefficient of the power spectrum gains obtained from the outputs of the first and second band-pass filters decrease with increase of the engine speed, and in which the weighting coefficient of the power spectrum gain obtained from the output of the fifth band-pass filter increases with increase of the engine speed.

6. An engine control system comprising:
   an engine vibration sensing means which produces a signal which represents a vibration of an engine;
   an engine speed sensing means which produces a signal which represents the speed of the engine;
   parallel arranged band-pass filters to which the vibration representative signal from said engine vibration sensing means is fed simultaneously, said band-pass filters having respective pass-bands which are not overlapped;
   knocking judging means for judging whether the engine is under knocking or not by analyzing the output signals issued from said band-pass filters and the engine speed representative signal from said engine speed sensing means; and
   an ignition timing control means which delays the ignition timing of the engine when said knocking judging means judges that the engine is under knocking,
   wherein said knocking judging means includes:
     means for deriving respective power spectrum gains of the output signals of said band-pass filters at each engine speed;
     means for adding said power spectrum gains to obtain a sum total; and
     means for comparing said sum total with a reference gain.

7. An engine knocking detecting system as claimed in claim 6, in which said knocking judging means further comprises weighting means which weights the respective power spectrum gains in accordance with the rotation speed of the engine.

* * * * *